June 11, 1963    HANS-JOACHIM M. FÖRSTER ET AL    3,093,013
REVERSIBLE TRANSMISSION, PARTICULARLY FOR MARITIME PURPOSES
Filed March 8, 1960
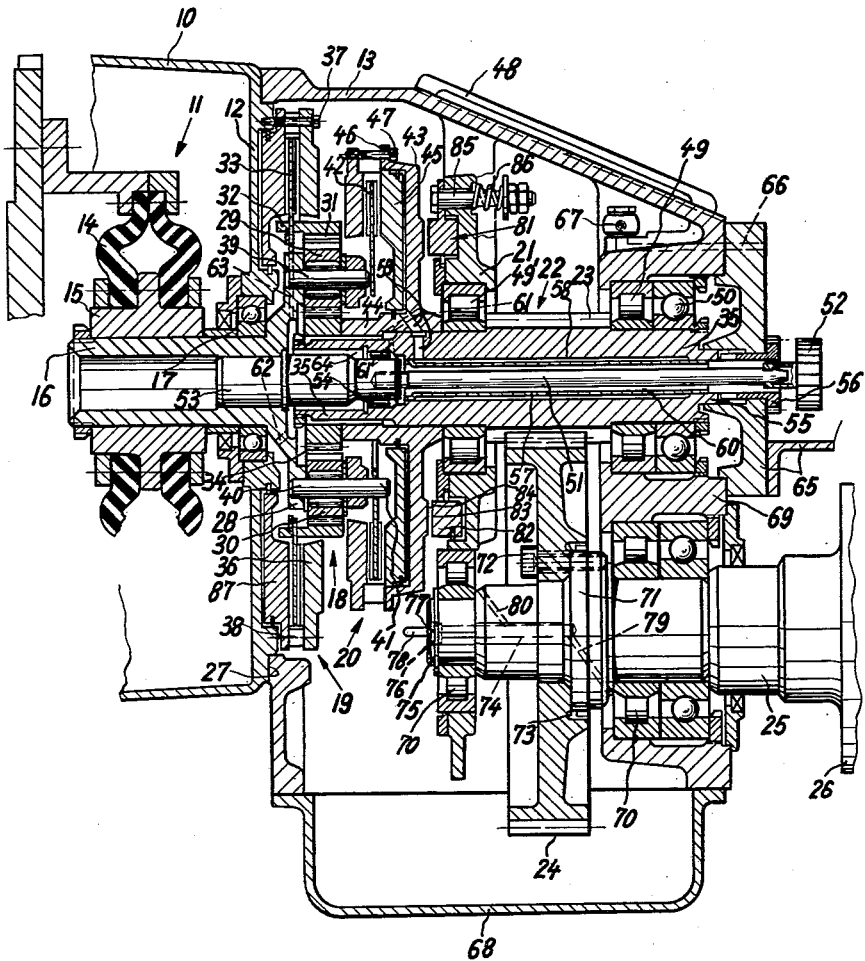
INVENTORS
HANS-JOACHIM M. FÖRSTER
KARL HEINRICH
BY Dickey, Craig & Freudenberg
ATTORNEYS

United States Patent Office 3,093,013
Patented June 11, 1963

3,093,013
REVERSIBLE TRANSMISSION, PARTICULARLY FOR MARITIME PURPOSES
Hans-Joachim M. Förster, Stuttgart-Bad Cannstatt, and Karl Heinrich, Waldenweiler, Kreis, Backnang, Germany, assignors to Daimler-Benz Aktiengesellschaft, Stuttgart-Unterturkheim, Germany
Filed Mar. 8, 1960, Ser. No. 13,582
Claims priority, application Germany Mar. 11, 1959
11 Claims. (Cl. 74—788)

Our invention relates to a reversible transmission and particularly to a transmission of this type which can be controlled by fluid pressure and is interposed between an engine and the propeller of a boat, the transmission being of the type including a reversible epicyclic gearing connecting the driving shaft with the driven shaft for optional common rotation or rotation in opposite directions.

It is the object of our invention to provide an improved transmission differing from prior transmissions of this type by reduced length and by a reduced diameter. Further objects of our invention are to provide an improved reversible transmission of the type stated hereinabove which tapers in diameter in the direction from the driving shaft to the driven shaft; to equip the transmission with an additional brake provided in addition to the reversing brake for optionally arresting the driven shaft as is desirable, for instance, for fishing vessels to prevent the nets being hauled in from getting entangled with the propeller; and to provide the transmission with a housing capable of being mounted on a co-axial casing for a flexible coupling in different angular relationships enabling the output shaft to be laterally offset from the driving shaft.

Further objects of our invention will appear from a detailed description thereof following hereinafter with reference to the accompanying drawing. It is to be understood, however, that our invention is in no way restricted to such details but is capable of numerous modifications within the scope of the appended claims and that the terms and phrases used in such detailed description have been chosen for the purpose of explaining our invention rather than that of restricting or limiting the same.

In the accompanying drawing we have shown a vertical longitudinal section through the fly-wheel of an engine and to the reversing transmission connected therewith, a portion only of the clutch casing surrounding the fly-wheel being shown.

A casing 10 suitably connected with an engine by flanges bolted to each other or otherwise surrounds a flexible coupling 11 of any desired type establishing a resilient driving connection between the fly-wheel of the engine and a hub member 15 through the intermediary of flexible coupling members 14. An end wall 12 is common to the casing 10 and to a housing 13 of the reversible transmission to be described hereinafter.

The hub member 15 is mounted on and fixed to a driving shaft 16 extending into the transmission housing 13 through an aperture of the end wall 12 in which the shaft is journaled by a bearing 17.

The housing 13 surrounds a reversible epicyclic gearing connecting the driving shaft 16 to a driven shaft 35 disposed co-axially thereto for optional common rotation or rotation in opposite direction. This reversible epicyclic gearing comprises a sun gear element 34 mounted on and fixed to the driven shaft 35, a planetary gear carrier element 28 formed by an integral flange of the driving shaft 16 and provided with a plurality of pins 39, 40 for mounting planetary gears, such pins extending parallel to the common axis of the shafts 16 and 35, and an annular internal gear element 31 having a lateral cylindrical flange 32, these elements being mounted for independent rotation about their common axis. Moreover, the reversible transmission comprises at least one pair of meshing planetary gears, but preferably a plurality of such pairs, one gear 29 of each pair engaging the sun gear 34 and the other planetary gear 30 of each pair engaging the annular internal gear 31.

A brake designated by 19 as a whole is mounted within the housing 13 adjacent to the end wall 12 thereof for optionally arresting the annular internal gear 31 causing the driven shaft 35 to be driven in reverse. Moreover, the housing includes a disengageable friction clutch designated by 20 as a whole for optionally clutching the planetary gear carrier element 28, 39, 40 to the driven shaft 35 causing the latter to rotate in forward direction.

The end wall 12 of the housing 13 is detachably secured to the remainder of the housing 13, such remainder comprising an integral structure composed of a peripheral wall open at its bottom, of an end wall 69 opposite to the end wall 12 and provided with at least one aperture for journaling the driven shaft 35 and of a partition 21 extending parallel to the end walls 12 and 69 being substantially equally spaced therefrom. The transmission further comprises an oil pan 68 mounted on the bottom of the integral housing structure. A hydraulic pump unit is mounted on the end wall 69 to close the aperture in which the driven shaft 35 is journaled by antifriction bearings 49 and 50.

An output shaft 25 extends parallel to the driven shaft 35 and out of the housing 13 and is journaled in the partition 21 by a roller bearing 70 and in the end wall 69 by a roller bearing 70′ and an adjacent ball bearing. Pinion teeth 22 cut into the driven shaft 35 and disposed between the partition 21 and the end wall 69 of the housing 13 are in permanent mesh with a larger gear 24 mounted on the output shaft 25 and on a flange 71 integral therewith. Preferably, the gear 24 and the flange 71 are formed with engaging clutch teeth 73 and suitable means, such as bolts 72, are provided to keep the clutch teeth in permanent engagement with each other so as to enable them to transfer the driving torque from the gear 24 to the output shaft 25. The latter is provided with an end flange 26.

Preferably, the housing 13 is connected with the casing 10 by adjoining annular faces 27 which are disposed coaxially to the shafts 16 and 35 and are bolted to each other by a plurality of circumferentially evenly distributed bolts. This offers the advantageous possibility of assembling the housing 13 and the casing 10 in different angular relationships to thereby dispose the output shaft 25 either directly below the driven shaft 35 or in laterally offset position, as desired. In this manner, the transmission housing 13 may be so assembled on the casing 10 as to bring the output shaft 25 into registry with the propeller shaft, where the engine is laterally offset from the propeller shaft.

Both the brake 19 and the clutch 20 comprise a single disk and a pair of members relatively movable by a suitable pressure fluid, said disk engaging between said members for frictional engagement therewith. The brake disk 33 has internal teeth engaging notches of the flange 32, whereas the pair of brake members 87 and 36 is non-rotatably mounted on the end wall 12 of the housing 13 by a plurality of circumferentially distributed bolts 37, the member 87 being axially displaceably mounted on such bolts and having an annular portion slidably guided in an annular recess of the end wall 12 to form an expansible chamber therewith. If a fluid under pressure is admitted to that chamber, the member 87 acting as a plunger will be moved on the bolts 37 towards the member 36 so as to clamp the friction disk 33 therebetween.

The single clutch disk 42 has holes provided near its inner periphery and engaged by the ends of the pins 39 and 40. Hence, the clutch disk 42 is mounted for common rotation with the planetary gear carrier element and the driving shaft 16. The pair of clutch members 45 and 45' is mounted on a flange 43 of a hub 44 by means of a plurality of circumferentially distributed bolts 47 securing the clutch members 45 and 45' to the flange 43 for common rotation therewith but permitting axial displacement of the clutch member 45 which is slidably guided between cylindrical shoulders of flange 43 and hub 44 to form an expansible chamber therewith. When fluid under pressure is admitted to that chamber through ducts 59 provided in said hub 49 and in the driven shaft 35, the clutch member 45 acting as a plunger is forcibly moved towards the clutch member 45' to frictionally engage the clutch disk 42 therebetween.

When that happens, the brake 19 must be released. As a result, the driving shaft 16 will be clutched to the driven shaft 35 for common rotation therewith and with the elements 28, 29 and 31 of the epicyclic gearing. When the clutch 20, however, is disengaged, while the brake 19 is engaged, the annular gear 31 will be arrested and causes the planetary gears 29 and 30 to drive the sun gear 34 and the driven shaft 35 rigidly connected therewith in reverse direction with respect to the driving shaft 16. The ratios of the diameters of the gears 34 and 31 may be so chosen that the ratio of transmission between the driving shaft 16 and the driven shaft 35 is 1:1 in reverse.

The integral structure of the housing 13 may be provided with an opening in its top which is closed by a cover 48 and affords access to the bolts 47.

Preferably, the aperture of the end wall 69 accommodating the bearings 49 and 50 of the driven shaft 35 has so much larger a diameter than the pinion teeth 22 that the driven shaft 35 may easily be exchanged for another shaft 35 forming a pinion having a larger or smaller number of teeth. Therefore, if it is desired, to vary the ratio of transmission between the driven shaft 35 and the output shaft 25 it is easily possible to exchange the driven shaft 35 and the gear 24.

The pump unit 65 mentioned hereinabove which covers the aperture of the end wall 69 accommodating the bearings 49 and 50 preferably includes a primary gear pump 52 and a secondary gear pump 56. The primary gear pump 52 includes a pair of gears one of which only is shown in the drawing. This gear is connected with the driving shaft 16 by means of a centering pin 53 and an auxiliary shaft 51 fixed to the centering pin and to the gear 52. The centering pin 53 is inserted in an axial bore of the driving shaft 16 being fixed to the latter and extends into one end of the hollow driven shaft 35 and carries a roller bearing 54 supporting the driven shaft 35. The secondary gear pump 56 comprises a pair of meshing gears only one of which is shown in the drawing. This gear is fixed to a reduced section 55 of the driven shaft 35.

A tubular member 57 is inserted in the hollow driven shaft 35, clearances constituting outer and inner annular spaces being provided between the tubular member 57, the driven shaft 35 and the auxiliary shaft 51. The outer annular space 58 is sealed near both ends of the tubular member 57 by enlarged end sections thereof sealingly engaging the internal wall of the hollow driven shaft 35. The outer annular space 58 communicates with the ducts 59 for the actuation of the clutch 20 and with a duct (not shown) provided in the body 65 of the pump unit and adapted to be put into communication with the outlets of the primary pump and of the secondary pump by a suitable valve (not shown). Hence, actuation of this valve supplies oil under pressure from the primary pump or a secondary pump or both to the outer annular space 58 and thence through ducts 59 to the clutch 20 for engagement thereof.

The inner annular space 60 provided between the tubular member 57 and the auxiliary shaft 51 is in permanent communication with the discharge ports of the pumps to supply lubricant to the bearings 49, 50, 17 and 54 and to the epicyclic gear elements. For that purpose, ducts 61 and 61' are provided in shaft 35 and hub member 44. The duct 61' provided in shaft 35 communicates with the clearance 64 between the centering pin 53 and the internal wall of the shaft 35 and this clearance, in turn, communicates with the inner annular space 60. Bores 62 and 63 provided in the planetary gear carrier element 28 conduct the oil from the clearance 60 to the bearing 17 and to the teeth of the annular gear 31, respectively.

The unit 65 which includes the valve mentioned hereinabove for controlling the clutch 20 and another valve for the control of the brake 19 is provided with a discharge port 66 from which oil under pressure flows through a suitable duct provided in the end wall 69 to a pipe connector 67 from which a pipe 78 leads through a suitable aperture provided in the partition 21 to a nozzle-like end section 78 mounted by suitable means not shown in axial registry with the inner end of the output shaft 25. The inner end section of this shaft is provided with an axial bore 74 having a flaring mouth 76 adapted to sealingly accommodate the nozzle-like end section of pipe 78. A duct 79 connects the bore 74 with the aperture of end wall 69 accommodating the antifriction bearings including bearing 70 for the lubrication thereof. A duct 80 leads from the axial bore 74 to the roller bearing 70 inserted in an aperture of the partition 21 and supporting the inner end of the output shaft 25.

The admission of oil under pressure to the expansible chamber formed by the brake member 87 for the actuation of the brake 19 is effected by suitable bores (not shown) provided in the housing 13 and in the end wall 12 thereof.

The partition 21 supports an additional brake provided for the purpose of enabling the operator to arrest the driven shaft 35 for the purpose of stopping the propeller of the boat. This is necessary for fishing vessels, when the nets are hauled in to prevent them from getting entangled with the propeller. The auxiliary brake is formed by an annular brake member 81 guided for axial sliding movement in an annular groove provided in the left-hand side face of the partition 21 and adapted to be supplied with fluid under pressure adapted to forcibly displace the annular brake member 81 towards and into engagement with the flange 43 of the hub member 44 fixed to the driven shaft 35. Normally, the friction faces 83 and 84 of the brake member 81 and the flange 43 are held in spaced relationship by springs 86 surrounding pins 85 between the partition 21 and suitable nuts on said pins, the latter extending through bores of the partition 21 and being connected to an external flange of the auxiliary brake member 81. As this auxiliary brake acts on the driven shaft 35 rather than on the output shaft 25, the required braking couple is relatively low and may readily be taken up in the manner described. The pins 85 slidably guided in the partition 21 will hold the annular brake member 81 against rotation.

The external diameter of the clutch 20 is smaller than that of the brake 19 but larger than that of the auxiliary brake 81. As a result, the housing 13 tapers in the direction from the driving shaft 16 to the driven shaft 35, thereby reducing its dimensions to a minimum.

The transmission described hereinabove is composed of four sub-assemblies which may be preassembled individually and may be composed subsequently. The first sub-assembly comprises the housing 13, the output shaft 25, the bearings 70 thereof, the gear 24 and the additional brake member 81 carried by the partition 21.

The second sub-assembly comprises the driven shaft 35 integral with the pinion 23, the clutch 20 for forward speed, the sun gear 34 and the bearings 49, 49' and 50.

This second sub-assembly can be inserted into the first sub-assembly from one side thereof, suitably from the side on which the driving shaft 16 is located.

The third sub-assembly comprises the casing 10, the brake 19 for reverse speed, the annular internal gear 31, the flexible coupling 11, the driving shaft 16 and the planetary gear carrier element 28 integral therewith. This third sub-assembly is introduced into the housing 13 from the left with reference to the drawing and is then fixed in place.

The fourth sub-assembly is constituted by the hydraulic pump unit 65 placed on the end wall 69 of the housing so as to cover the aperture accommodating the bearings 49 and 50.

This assembly of the three sub-assemblies never requires introduction of any splined shafts but merely requires that gear teeth be engaged.

From the foregoing it will be seen that this invention is one well adapted to attain all of the ends and objects hereinabove set forth, together with other advantages which are obvious and which are inherent to the apparatus.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. Reversible transmission comprising a sun gear element, an annular internal gear element, a planetary gear carrier element, said elements being mounted for independent rotation about a common axis, at least one pair of planetary gears meshing with each other and being rotatably mounted on said carrier element, one of said planetary gears meshing with said sun gear element and the other one of said planetary gears meshing with said annular internal gear element, a driving shaft fixed to said planetary gear carrier element, an optionally engageable friction brake co-ordinated to said annular internal gear for optionally arresting same, a driven shaft fixed to said sun gear element, and an optionally disengageable friction clutch for drivingly connecting said planetary gear carrier element to said driven shaft and including annular clutch members co-axially disposed with respect to said axis, a housing surrounding said elements, said brake and said clutch, said driving shaft extending into said housing on one side thereof, said brake including a plurality of annular brake members surrounding said annular internal gear element, means non-rotatably mounting said plurality of, annular brake members on said side of said housing, said plurality of members, and said elements being disposed between said side of said housing and said clutch.

2. Transmission as claimed in claim 1 in which one of said annular clutch members is fixed to said driven shaft, said transmission further comprising an additional brake member mounted for engagement with said last mentioned clutch member fixed to said driven shaft for optionally arresting said driven shaft.

3. Transmission as claimed in claim 1 in which the outer diameter of said annular clutch members is smaller than the outer diameter of said annular brake members.

4. Transmission claimed in claim 1 in which said optionally engageable friction brake includes a disk non-rotatably connected to said annular internal gear, said planetary gear carrier element including pins for mounting said planetary gears, one of said annular clutch members being a disk mounted on the ends of at least some of said pins.

5. Transmission as claimed in claim 1 further comprising a flexible coupling mounted on said driving shaft for connection with a driving element and a casing surrounding said flexible coupling, said housing on said one side thereof having an end wall detachably secured to the remainder of said housing, said end wall being common to said housing and to said casing.

6. Transmission claimed in claim 1 wherein said driven shaft is hollow, hydraulic means for controlling said friction clutch comprising a hydraulic pump unit including a primary pump and a secondary pump, driving means for said primary pump comprising an auxiliary shaft extending through said driven shaft and operatively connected with said driving shaft and with said primary pump, said secondary pump being operatively connected with said driven shaft to be driven thereby.

7. Transmission as claimed in claim 1 in which said driven shaft is hollow, said transmission further comprising a centering pin fixed to said driving shaft and extending into one end of said driven shaft, a bearing journaling said driven shaft on said centering pin, hydraulic means for controlling said friction clutch comprising a pump unit mounted on said bushing adjacent to the other end of said driven shaft, and an auxiliary shaft fixed to said centering pin and extending through said driven shaft, said pump unit being operatively connected to said auxiliary shaft.

8. Reversible transmission comprising a sun gear element, an annular internal gear element, a planetary gear carrier element, said elements being mounted for independent rotation about a common axis, at least one pair of planetary gears meshing with each other and being rotatably mounted on said carrier element, one of said planetary gears meshing with said sun gear element and the other one of said planetary gears meshing with said annular internal gear element, a driving shaft fixed to said planetary gear carrier element, an optionally engageable friction brake co-ordinated to said annular internal gear for optionally arresting same, a driven shaft fixed to said sun gear element, and an optionally disengageable friction clutch for drivingly connecting said planetary gear carrier element to said driven shaft and including annular clutch members co-axially disposed with respect to said axis, a housing surrounding said elements, said brake and said clutch, said driving shaft extending into said housing on one side thereof, said brake including annular brake members surrounding said annular internal gear element and being non-rotatably mounted on said housing on said side thereof, said elements being disposed between said side of said housing and said clutch, a resilient clutch mounted on said driving shaft for connection with a driving element and a clutch casing surrounding said resilient clutch, said housing on said one side thereof having an end wall detachably secured to the remainder of said housing, said end wall being common to said housing and to said clutch casing, said remainder of said housing comprising an integral structure composed of a peripheral wall open at its bottom, of an end wall opposite to said one side of said housing and provided with at least one aperture for journaling said driven shaft and of a partition extending parallel to said end wall, said transmission further comprising an oil pan mounted on the bottom of said integral structure and a hydraulic pump unit mounted on said end wall of said structure to close said aperture therein.

9. Reversible transmission comprising a sun gear element, an annular internal gear element, a planetary gear carrier element, said elements being mounted for independent rotation about a common axis, at least one pair of planetary gears meshing with each other and being rotatably mounted on said carrier element, one of said planetary gears meshing with said sun gear element and the other one of said planetary gears meshing with said annular internal gear element, a driving shaft fixed to said planetary gear carrier element, an optionally engageable friction brake co-ordinated to said annular internal gear for optionally arresting same, a driven shaft fixed to said sun gear element, and an optionally disengageable friction clutch for drivingly connecting said planetary gear carrier element to said driven shaft and including annular clutch members co-axially disposed with respect to said axis, a housing surrounding said elements, said brake and said clutch, said driving shaft extending into said housing on one side thereof, said brake including annular brake members surrounding said annular internal gear element and being non-rotatably mounted on said housing on said side thereof, said elements being disposed between said side of said housing and said clutch, a resilient clutch mounted on said driving shaft for connection with a driving element and a clutch casing surrounding said resilient clutch, said housing on said one side thereof having an end wall detachably secured to the remainder of said housing, said end wall being common to said housing and to said clutch casing, said remainder of said housing comprising an integral structure composed of a peripheral wall open at its bottom, of an end wall opposite to said one side of said housing and provided with at least one aperture for journaling said driven shaft and of a partition extending parallel to said end wall, said transmission further comprising an oil pan mounted on the bottom of said integral structure and a hydraulic pump unit mounted on said end wall of said structure to close said aperture therein, an output shaft journaled in said housing and extending through said end wall of said integral structure and a set of meshing reducing gears mounted on said driven shaft and said output shaft for driving the latter, said partition being disposed between said gear elements and said set of meshing reducing gears adjacent to the latter, said additional brake member being mounted on said partition.

10. Reversible transmission comprising a sun gear element, an annular internal gear element, a planetary gear carrier element, said elements being mounted for independent rotation about a common axis, at least one pair of planetary gears meshing with each other and being rotatably mounted on said carrier element, one of said planetary gears meshing with said sun gear element and the other one of said planetary gears meshing with said annular internal gear element, a driving shaft fixed to said planetary gear carrier element, an optionally engageable friction brake co-ordinated to said annular internal gear for optionally arresting same, a driven shaft fixed to said sun gear element, and an optionally disengageable friction clutch for drivingly connecting said planetary gear carrier element to said driven shaft and including annular clutch members co-axially disposed with respect to said axis, a housing surrounding said elements, said brake and said clutch, said driving shaft extending into said housing on one side thereof, said brake including annular brake members surrounding said annular internal gear element and being non-rotatably mounted on said housing on said side thereof, said elements being disposed between said side of said housing and said clutch, a hydraulic pump unit including a primary pump co-ordinated to said driving shaft to be driven thereby and a secondary pump co-ordinated to said driven shaft to be driven thereby, said pump unit being mounted on said housing on the side opposite to said one side thereof, said driven shaft being hollow, an auxiliary shaft extending through said driven shaft and being fixed to said driving shaft and to said primary pump, an expansible chamber co-ordinated to said friction clutch for the hydraulic actuation thereof, bearing means co-ordinated to said driving shaft to said driven shaft and to said housing for journaling said shafts upon each other in said housing, and a tubular member inserted in said driven shaft and surrounding said auxiliary shaft to confine therewith an outer annular space and an inner annular space, each of said spaces communicating with said pumps, said outer annular space further communicating with said expansible chamber and the inner annular space communicating with said bearing means for the lubrication of the latter.

11. Reversible transmission comprising a sun gear element, an annular internal gear element, a planetary gear carrier element, said elements being mounted for independent rotation about a common axis, at least one pair of planetary gears meshing with each other and being rotatably mounted on said carrier element, one of said planetary gears meshing with said sun gear element and the other one of said planetary gears meshing with said annular internal gear element, a driving shaft fixed to said planetary gear carrier element, an optionally engageable friction brake co-ordinated to said annular internal gear for optionally arresting same, a driven shaft fixed to said sun gear element, and an optionally disengageable friction clutch for drivingly connecting said planetary gear carrier element to said driven shaft and including annular clutch members co-axially disposed with respect to said axis, a housing surrounding said elements, said brake and said clutch, said driving shaft extending into said housing on one side thereof, said brake including annular brake members surrounding said annular internal gear element and being non-rotatably mounted on said housing on said side thereof, said elements being disposed between said side of said housing and said clutch, said housing including a partition extending transversely to said shafts, said transmission further comprising an output shaft extending parallel to said driving shaft and to said driven shaft and out of said housing, bearings carried by said housing for journaling said output shaft, a set of meshing gears fixed to said driven shaft and to said output shaft, respectively, the inner end of said output shaft being provided with a central bore and with ducts extending therefrom and leading to said bearings for the lubrication thereof, a lubricating pump geared to at least one of said shafts, and a conduit leading from said lubricating pump through said partition to the end of said central bore.

References Cited in the file of this patent

UNITED STATES PATENTS

| | | |
|---|---|---|
| 1,229,417 | Daft | June 12, 1917 |
| 1,392,985 | Tuttle | Oct. 11, 1921 |
| 1,681,384 | Waters | Aug. 21, 1928 |
| 1,694,295 | Tuttle | Dec. 4, 1928 |
| 1,778,432 | Ramsey | Oct. 14, 1930 |
| 2,085,668 | Mueller | June 29, 1937 |
| 2,445,828 | Heinsohn | July 27, 1948 |
| 2,521,239 | McDowall et al. | Sept. 5, 1950 |
| 2,813,435 | Schumb | Nov. 19, 1957 |
| 2,877,668 | Kelbel | Mar. 17, 1959 |
| 2,906,137 | Bade | Sept. 29, 1959 |